United States Patent
Argue et al.

(10) Patent No.: US 9,010,635 B2
(45) Date of Patent: Apr. 21, 2015

(54) LAYAWAY APPARATUS AND METHOD

(71) Applicants: Stuart Argue, Palo Alto, CA (US); Anthony Emile Marcar, San Francisco, CA (US)

(72) Inventors: Stuart Argue, Palo Alto, CA (US); Anthony Emile Marcar, San Francisco, CA (US)

(73) Assignee: Wal-Mart Stores, Inc., Bentonville, AK (US)

( * ) Notice: Subject to any disclaimer, the term of this patent is extended or adjusted under 35 U.S.C. 154(b) by 134 days.

(21) Appl. No.: 13/665,875

(22) Filed: Oct. 31, 2012

(65) Prior Publication Data

US 2014/0117079 A1     May 1, 2014

(51) Int. Cl.
*G06K 15/00* (2006.01)
*G06Q 40/02* (2012.01)

(52) U.S. Cl.
CPC ..................................... *G06Q 40/02* (2013.01)

(58) Field of Classification Search
USPC .............................. 235/375, 383, 385, 462.01
See application file for complete search history.

(56) References Cited

U.S. PATENT DOCUMENTS

| | | | |
|---|---|---|---|
| 8,584,934 B2 | 11/2013 | Hansen | |
| 8,612,349 B1 | 12/2013 | Ledder | |
| 8,615,439 B2 | 12/2013 | Ramaratnam | |
| 2002/0161630 A1 | 10/2002 | Bird et al. | |
| 2003/0120572 A1 | 6/2003 | Angeli et al. | |
| 2005/0222951 A1 | 10/2005 | Sherman | |
| 2007/0078716 A1 | 4/2007 | Tews | |
| 2007/0175992 A1* | 8/2007 | Brown | 235/385 |
| 2007/0198382 A1 | 8/2007 | Ferrari | |
| 2008/0052180 A1* | 2/2008 | Lawhorn | 705/26 |
| 2008/0147561 A1* | 6/2008 | Euchner et al. | 705/64 |
| 2009/0254447 A1 | 10/2009 | Blades | |
| 2010/0138287 A1 | 6/2010 | Hoque | |
| 2011/0108622 A1* | 5/2011 | Das et al. | 235/380 |
| 2011/0161230 A1* | 6/2011 | Singh | 705/44 |
| 2012/0046958 A1 | 2/2012 | Pynadath | |
| 2012/0284130 A1* | 11/2012 | Lewis et al. | 705/16 |
| 2012/0290367 A1 | 11/2012 | Scipioni | |
| 2013/0085823 A1 | 4/2013 | Gibson | |
| 2013/0090980 A1 | 4/2013 | Hummel | |
| 2013/0103477 A1 | 4/2013 | Ackley | |
| 2013/0218778 A1* | 8/2013 | Singh | 705/44 |
| 2014/0019317 A1* | 1/2014 | Casares et al. | 705/30 |

FOREIGN PATENT DOCUMENTS

| | | |
|---|---|---|
| CN | 02802410 | 12/2003 |
| WO | WO0141056 A1 | 6/2001 |
| WO | WO2013024879 A1 | 2/2013 |

\* cited by examiner

*Primary Examiner* — Tuyen K Vo
(74) *Attorney, Agent, or Firm* — Howard & Howard Attorneys PLLC

(57) ABSTRACT

A method for associating a computing device of a customer with a layaway transaction corresponding to the customer is disclosed. The method may begin with a computer system initiating a layaway transaction with a customer. The computer system may then issue a receipt documenting the layaway transaction and comprising a machine readable code. The customer may use a computing device (e.g., mobile telephone) in his or her possession to scan the machine readable code. Accordingly, the computer system may receive, from the computing device, data extracted by the computing device from the machine readable code. The computer system, in response to the receiving, may link the computing device with the layaway transaction. The computer system may then serve an electronic receipt to the computing device.

19 Claims, 10 Drawing Sheets

LAYAWAY APPARATUS AND METHOD

RELATED U.S. APPLICATION

This application is related to U.S. application Ser. No. 13/665,869, filed Oct. 31, 2012. The application is incorporated herein by reference for all purposes.

BACKGROUND

1. Field of the Invention

This invention relates to layaway programs and more particularly to systems and methods for using electronic receipts within a layaway transaction.

2. Background of the Invention

Many point-of-sale (POS) and back office systems currently in use today do not support important emerging technologies, services, and marketing opportunities. For example, many POS and back office systems are limited in their ability to leverage the electronic receipt data they collect. Accordingly, what is needed is an apparatus and method expanding the ability of a wide variety of POS and back office systems, include legacy systems, to make improved use of the receipt data they collect.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
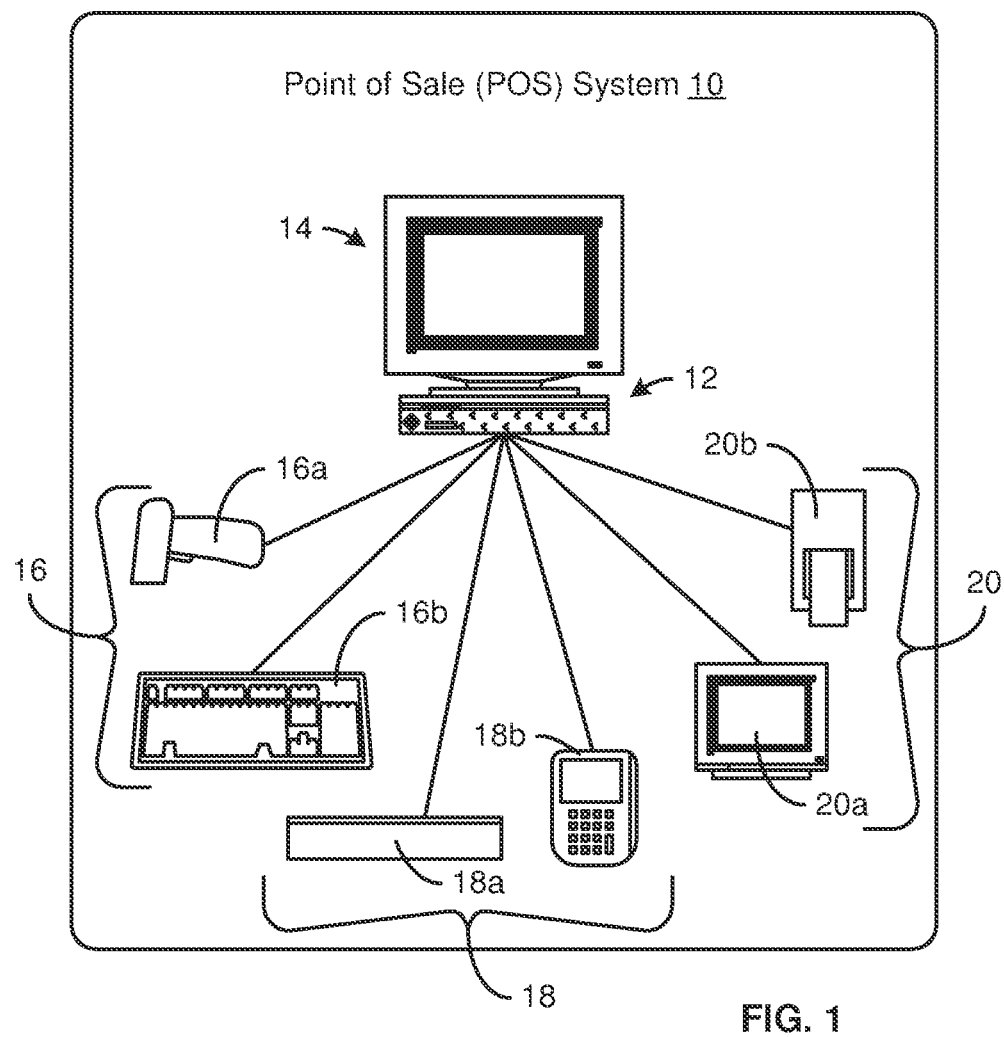
FIG. 1 is a schematic block diagram of one embodiment of a point-of-sale (POS) system for implement methods in accordance with the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for leveraging receipt data collected at a POS. For example, in selected embodiments, one method in accordance with the present invention may begin when an application is issued and/or installed on a computing device of a customer. The application may be programmed to enable a customer to receive a layaway receipt.

A customer may then enter a "brick-and-mortar" store and approach a POS system. At the POS system, a layaway transaction may be initiated. Once generated or obtained, receipt data corresponding to the layaway transaction may be passed from a POS system to one or more other computers within a computer system. Additionally, a POS system may present an advertisement containing a machine-readable code to a customer. For example, an advertisement may be presented to a customer via a printed paper receipt. Alternatively, or in addition thereto, an advertisement may be presented to a customer via some other output mechanism or customer-facing display.

A machine-readable code contained within an advertisement may be encoded with receipt data. Accordingly, should a customer respond to a call to action and wish to import receipt data, he or she may scan an advertisement using the camera of a computing device in his or her possession. Such action may enable a computer system to link a computing device in the possession of a customer to a layaway transaction corresponding to the customer. Moreover, by decoding the machine-readable code, an application may obtain and import the corresponding receipt data. Alternatively, a machine-readable code may direct a computing device to a particular resource from which the receipt data may be obtained.

Sometime after a layaway transaction has been initiated, a payment corresponding thereto may be issued and received. The payment may be received from a customer at a POS system within a brick-and-mortar location. Alternatively, a payment may be received remotely via a computing device of a customer. Once a payment is received, one or more records corresponding to a layaway transaction may be updated and an updated layaway receipt may be served or issued. For example, since a link may have been established between an application installed on the particular computing device and the layaway transaction, an electronic layaway receipt may be passed directly to the computing device.

This process of receiving, updating, and serving may be repeated until all required monies have been received. At that time, the layaway transaction may be completed and one or more corresponding items may be delivered to the customer.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support collection of receipt data that can be used to enhance or support a layaway transaction.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20a and receipt printer 20b may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
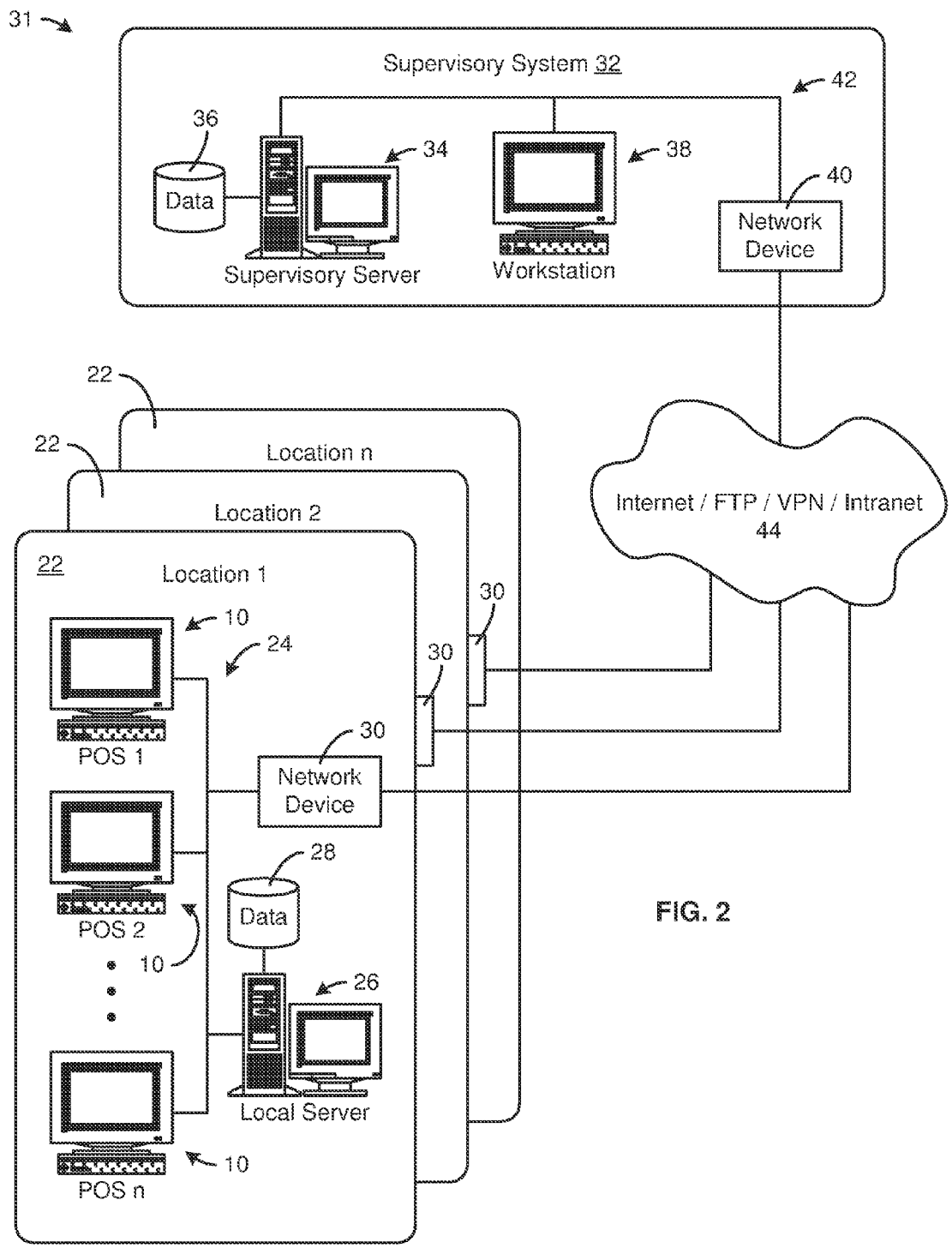
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a stand-alone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

Figure 3:
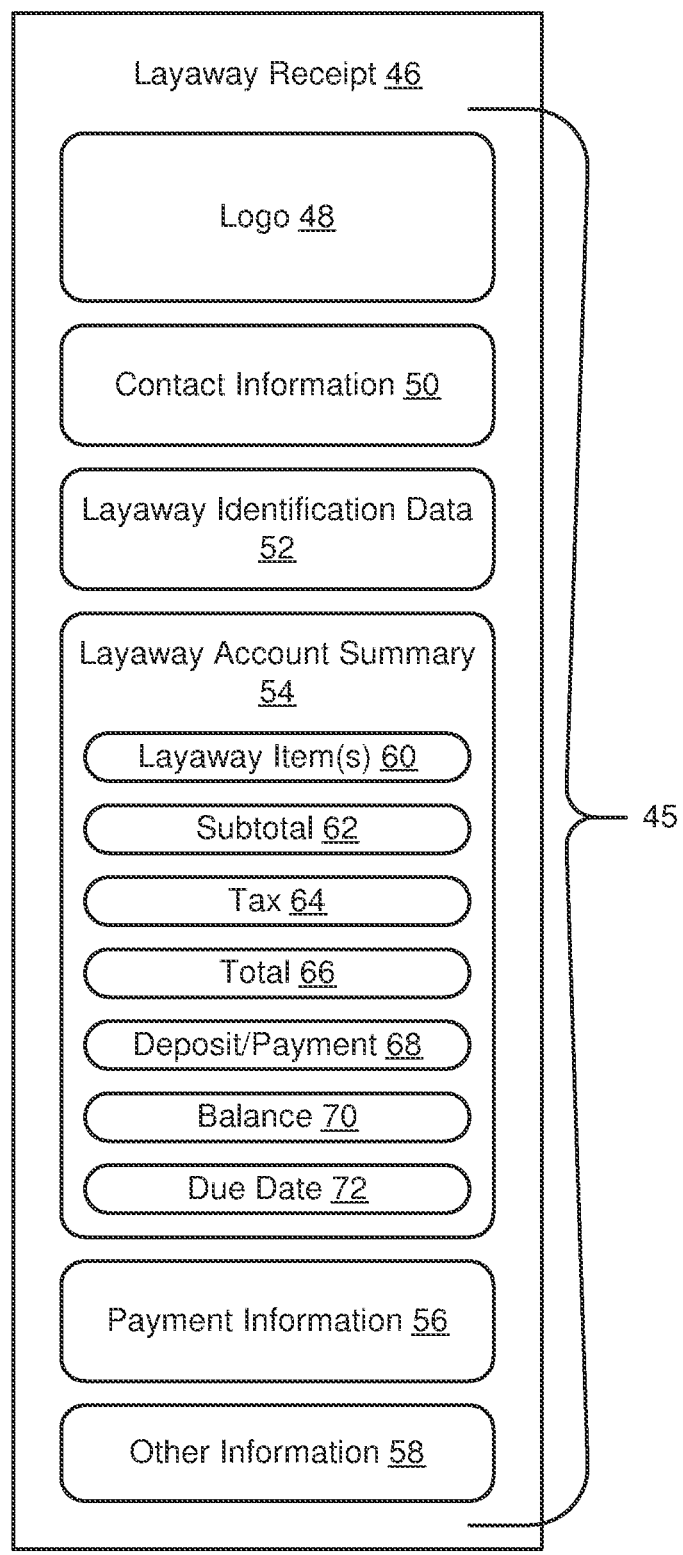
FIG. 3 is a schematic block diagram of one embodiment of a layaway receipt in accordance with the present invention.

Referring to FIG. 3, a POS system 10 may collect and/or generate receipt data 45. Receipt data 45 may document a transaction (e.g., sale, return, layaway, or the like) carried out or initiated at a POS system 10. Receipt data 45 may be presented or displayed to a customer in the form of a paper receipt, an electronic (e.g., paperless) receipt, or the like or some combination thereof.

In selected embodiments, receipt data 45 may be delivered to an application installed on a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 10, local servers 26, supervisory servers 34, some other onsite resources, an application installed on a computing device, some other offsite resources, or the like or combinations or sub-combinations thereof, hereinafter a "computer system").

In selected embodiments, receipt data 45 may correspond to or be presented within a layaway receipt 46. A layaway receipt 46 may document, in paper or electronic form, a layaway transaction. A layaway transaction may enable a customer to purchase an item without paying the entire cost of the item at once. However, unlike credit-based transactions or purchases, in a layaway transaction the customer does not receive the item until the total amount due has been paid.

One advantage of a layaway transaction is that no interest is typically charged. Additionally, the price of the item is fixed when the layaway transaction is initiated and, since the item is set aside, the availability of the item is guaranteed. To cover the cost of storing the item, a fee is typically associated with a layaway transaction. If a layaway transaction is not completed, the item may be returned to stock and the money paid by the customer (minus the layaway fee) may be returned.

In selected embodiments, a layaway receipt 46 may include a logo 48, contact information 50, layaway identification data 52, a summary 54 of the details of a layaway account, payment information 56, other information 58, or the like or a combination or sub-combination thereof.

A logo 48 may reinforce the brand and image of the associated entity within the mind of a consumer. By including contact information 50 on a layaway receipt 46, an entity may ensure that a customer has ready access to one or more physical addresses, Internet address, telephone numbers, facsimile numbers, hours of operation, or the like or combinations or sub-combinations thereof. Layaway identification data 52 may include one or more barcodes, a layaway account number, a customer identification number, or the like or a combination or sub-combination thereof.

In selected embodiments, a summary 54 of a layaway account may communicate, present, or list certain details corresponding to a layaway transaction. For example, such a summary 54 may present or list identification and/or pricing information 60 corresponding to one or more items forming the basis of the layaway transaction. A summary 54 may also present or list a subtotal 62, tax total 64, total amount due 66, one or more deposits or payments 68, outstanding balance 70, a due date 72 (e.g., the date by which the balance must be paid off), or the like or a combination or sub-combination thereof.

Payment information 56 (e.g., date of transaction, an indication of method of payment, an indication of which credit or debit card was used, etc.) may be included to document important details of a layaway transaction. Other information 58 may be included within a layaway receipt 46 as desired or necessary. For example, to promote brand loyalty, an entity may include an indication of an amount saved in the transaction, a yearly total of the amount saved, reward points earned, or the like. Alternatively, or in addition thereto, other information 58 may include promotional information, a solicitation to participate in a survey, an employment opportunity, contest information, or the like.

A layaway receipt 46 may be presented by a computing device of a customer in any suitable layout or format. For example, the receipt data 45 forming a layaway receipt 46 may be output by a receipt printer 20b as a paper receipt. Alternatively, or in addition thereto, a layaway receipt 46 may presented in electronic form as a simple textual list or with more formatting. For example, a layaway receipt 46 may comprise a virtual representation or layout substantially matching what a comparable paper receipt would look like.

The manner in which a layaway receipt 46 is presented or displayed on a computing device of a customer may be completely dictated by the computer system delivering the receipt data 45 thereto. Alternatively, the computing device of the customer may have an application (e.g., a receipt manager, accounting program, budgeting program, or the like) installed thereon. Such an application may partially or completely control the layout or format of one or more receipts (e.g., purchase receipts, return receipts, layaway receipts 46, and/or the like) displayed therewith or therethrough. For example, a computer system may supply receipt data 45, while the application installed on the computing device of the customer supplies the layout or formatting.

Figure 4:
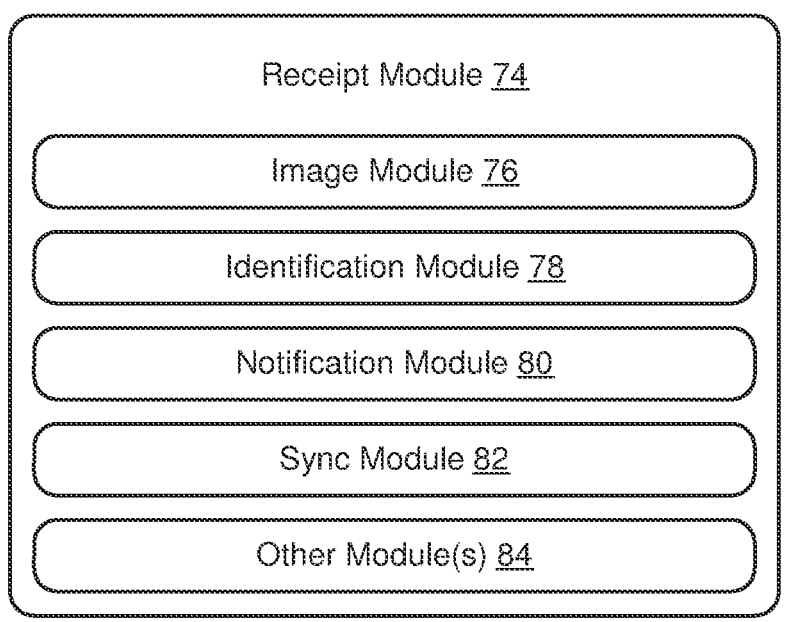
FIG. 4 is a schematic block diagram of one embodiment of a receipt module in accordance with the present invention.

Referring to FIG. 4, a computer system in accordance with the present invention may deliver receipt data 45 to a computing device of a customer in any suitable manner. In selected embodiments, a receipt module 74 may enable or support such delivery. A receipt module 74 may include any suitable arrangement of sub-components or modules. In certain embodiments, a receipt module 74 may include an image module 76, identification module 78, notification module 80, synchronization module 82, one or more other modules 84 as desired or necessary, or the like or a combination or sub-combination thereof.

An image module 76 may assemble, generate, or obtain an advertisement containing a call to action for display on a receipt (e.g., paper receipt), customer-facing display 20a, or the like. In selected embodiments, a call to action may invite or motive a consumer to download receipt data 45. To increase the likelihood that a consumer will respond favorably to the call to action, an advertisement may include an enabler facilitating the desired step or action. For example, in selected embodiments, an advertisement may include one or more machine-readable codes. By scanning such a code (e.g., scanning the code using a camera on his or her computing device), a consumer may import receipt data 45 encoded within the code. Alternatively, scanning the code may initiate the download of receipt data 45.

For example, a machine-readable code may be encoded with a URL. In addition to designating a particular resource, a URL may include a transaction identification, one or more pieces of layaway identification data 52 (e.g., a layaway account number, customer identification number, or the like), or a combination thereof. Accordingly, after an appropriate application is launched and a machine-readable code is scanned, a URL may be passed from a customer (e.g., from a mobile telephone of a customer) to an Internet Service Provider (e.g., a telecommunications provider). As a result, an appropriate resource within a computer system may be accessed and receipt data 45 may be returned to (e.g., downloaded by) a computing device.

In selected embodiments, a machine-readable code may comprise a barcode. For example, in certain embodiments, a machine-readable code may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

An identification module 78 may be tasked with generating, requesting, collecting, and/or communicating identification information linking a customer associated with a transaction with one or more records stored within a computer system. For example, as part of a transaction carried out at a POS system 10, an identification module 78 may request, collect, and/or communicate identification information linking a transaction to a particular computing device corresponding to the customer participating in the transaction. Thus, information corresponding to the transaction may be passed to the customer via the particular computing device.

An identification module 78 may request, collect, and/or communicate one or more types of identification information. For example, in selected embodiments, an identification module 78 may collect a unique identification or membership number from a customer. This may be done when a membership card, club card, loyalty card, identification card, credit card, debit card, fingerprint or other biometric characteristic, or the like is scanned, input, or otherwise collected at a POS system 10. In other situations, a cashier or customer may type in a unique identification number, payment number, membership number, or the like at a POS system 10. For example, while a cashier is processing a transaction, a customer may be prompted via a card reader 18b, customer-facing display 20a, or the like to enter (e.g., type in using the card reader 18b) a mobile telephone number corresponding to the customer. Alternatively, a cashier may type in a telephone number corresponding to the customer.

Once the identification information is received, it may be used directly (e.g., used directly to pass receipt data 45 to a computing device of a corresponding customer). Alternatively, or in addition thereto, the identification information may tie or link a current transaction to one or more previously stored computer records. For example, within such records, a computer system may find the information necessary to identify and communicate with a computing device of a corresponding customer.

In selected embodiments, an identification module 78 may obtain or generate identification information for a layaway transaction. For example, as part of a layaway transaction initiated at a POS system 10, an identification module 78 may generate or obtain a layaway account number, customer identification number, or the like or a combination thereof. Once generated or obtained, such information may be included as part of a receipt (e.g., presented directly as layaway identification data 52, encoded within a barcode, encoded within a machine readable code of an advertisement, or the like). Accordingly, information contained within a receipt may be used to link a customer to a transaction (e.g., a layaway transaction) corresponding to the customer.

A notification module 80 may assemble, generate, obtain, direct, and/or issue one or more push notifications. In selected embodiments, push notifications may be directed to a computing device of a customer. For example, when an appropriate application in not running on a computing device, push notifications may inform the customer that certain data or options are available (e.g., that a new receipt is available for download).

A synchronization module 82 may support or enable one way or two way data communication between a computer system and a computing device. For example, a synchronization module 82 may support or enable the passing of receipt data 45 from a computer system to a computing device. A synchronization module 82 may also enable certain data received from a computing device to be incorporated within or used by a computer system. For example, one or more user preferences (e.g., notification preferences) may be communicated to a computer system from an application resident on a computing device.

The various functions or modules of a receipt module 74 may be enacted or implemented by any suitable system or component thereof. For example, in selected embodiments, one or more functions or modules of a receipt module 74 may be distributed across one or more hardware devices, including a primary computer 12 of a POS system 10, a local server 26, a supervisory server 34, some other onsite resource, a computing device of a customer, some other offsite resource, or the like or combinations or sub-combinations thereof. Thus, systems and methods in accordance with the present invention may be adapted to a wide variety of situations, including more rigid legacy systems.

Figure 5:
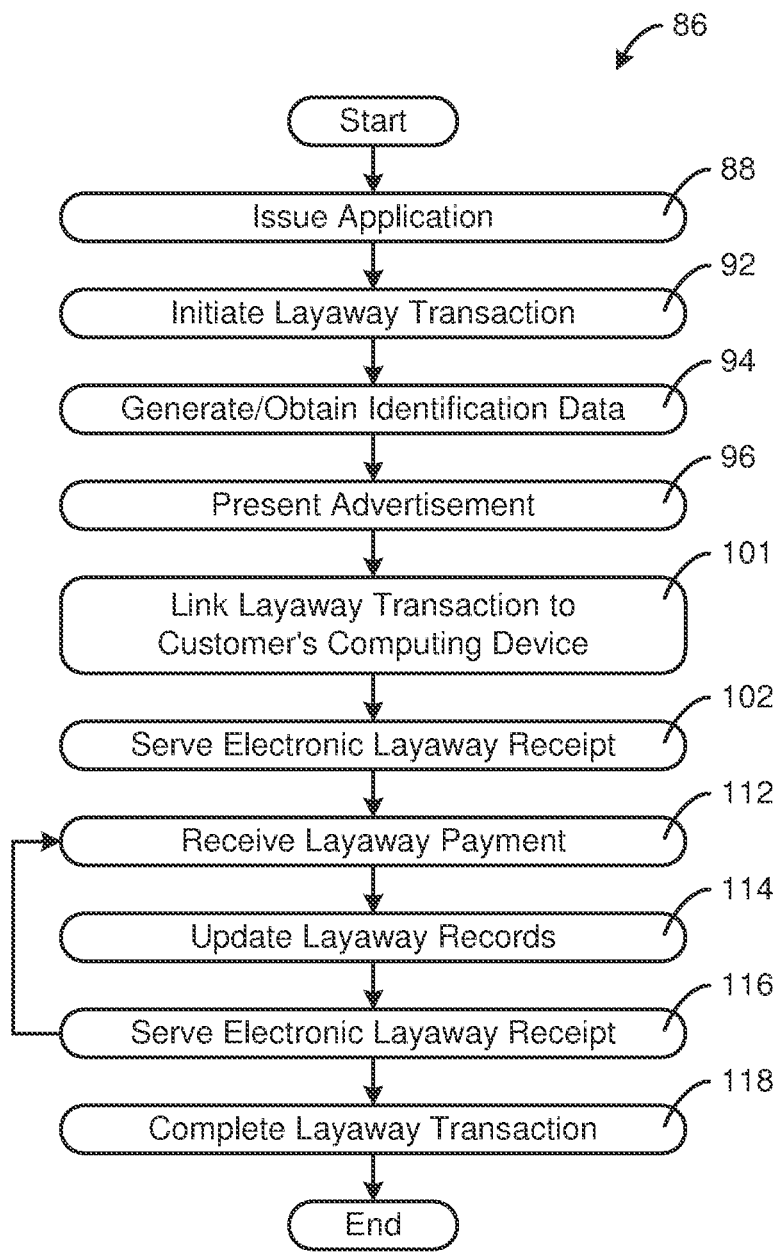
FIG. 5 is a block diagram of one embodiment of a method for processing a layaway transaction in accordance with the present invention.
Figure 6:
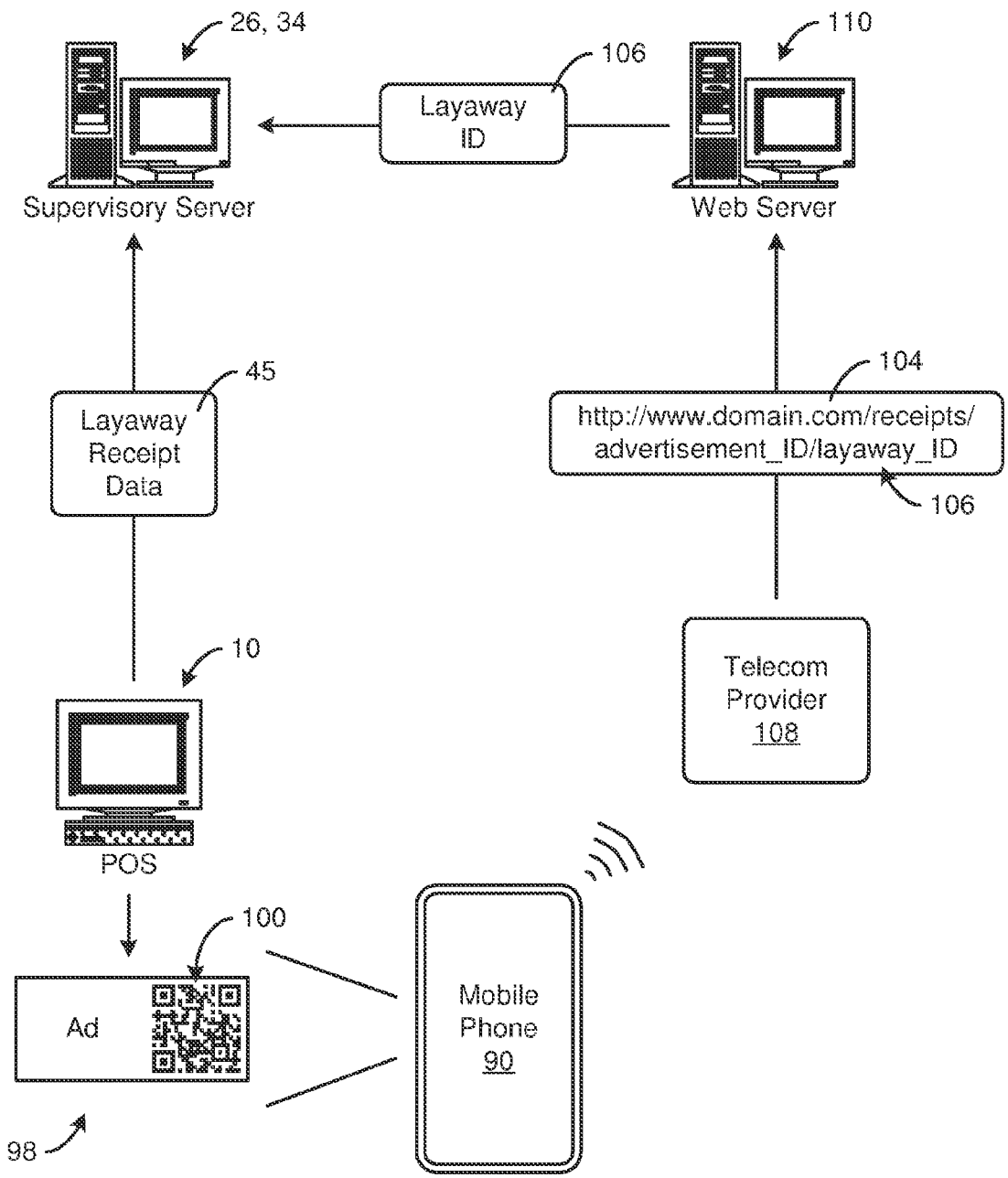
FIG. 6 is a block diagram of one embodiment of a method for passing electronic layaway receipt data from a point-of-sale system to a computing device of a customer.

Referring to FIGS. 5 and 6, one method 86 in accordance with the present invention may begin when an application programmed to receive, format, display, categorize, and/or analyze receipt data 45 is issued 88 and made available for installation on computing devices 90 of customers. A customer may then enter a "brick-and-mortar" business location (e.g., a brick-and-mortar retail store) and approach a POS system 10. At the POS system 10, a layaway transaction may be initiated 92.

As part of a layaway transaction, certain identification information or identification data 52 may be generated 94, obtained 94, or the like. For example, an identification module 78 may collect identification information (e.g., a membership number, telephone number, credit card number, or the like) as part of a POS transaction (e.g., a layaway transaction). This information may be used to link 101 a transaction to an appropriate computing device and to serve 102 an electronic receipt (e.g., an electronic layaway receipt 46) to the appropriate computing device.

Alternatively, such linking 101 and serving 102 may be accomplished through the presenting 96 and scanning of an advertisement. For example, a POS system 10 may generate 94 or obtain 94 a layaway account number, customer identification number, and the like. In certain embodiments, specific information may be collected from a customer. For example, a name of a customer may be recorded and associated with a layaway transaction.

Once generated or obtained, receipt data 45 corresponding to the layaway transaction may be passed from a POS system 10 to one or more other computers (e.g., servers 26, 34) within a computer system. Additionally, in selected embodiments, a POS system 10 may present 96 an advertisement 98 containing a machine-readable code 100 to a customer. In selected embodiments, an advertisement 98 may be presented to a customer via a printed paper receipt. Alternatively, or in addition thereto, an advertisement 98 (e.g., the same advertisement 98 or a different advertisement 98) may be presented to a customer via some other output mechanism 20. For example, in selected embodiments, one or more advertisements 98 may be presented to a customer via a customer-facing display 20a or screen 20a.

A customer-facing display 20a may take various forms. In selected embodiments, a customer-facing display 20a may be embodied as a stand-alone monitor dedicated to presenting information, advertisements 98, or the like to a customer at a POS. Alternatively, a customer-facing display 20a may be a multi-use screen capable of performing various functions. For example, in certain embodiments, a customer-facing display 20a may be embodied as a screen on a card reader 18b. That is, during or after a transaction, one or more advertisements 98 may be displayed on a screen or a portion of a screen of a card reader 18b.

A machine-readable code 116 contained within an advertisement 98 may be encoded with receipt data 45. Accordingly, should a customer respond to a call to action and wish to import receipt data 45, he or she may launch an appropriate application and scan the machine-readable code 100 of an advertisement 98. For example, a customer may scan an advertisement 98 using the camera of a computing device 90 in his or her possession (e.g., the camera of his or her mobile telephone 90). This may occur at the POS system 10 (e.g., from customer-facing display 20a), in which case there may be no need for a paper receipt. Alternatively, it may occur sometime later using an advertisement 98 printed as part of the transaction (e.g., an advertisement 98 printed on a paper receipt or on a piece of paper sized only to accommodate the advertisement 98).

When a computing device 90 scans a machine-readable code 100, decodes it, and acts on the data encoded therewithin, a computer system may link 101 a layaway transaction to the computing device or an account corresponding to (e.g., accessed via) the computing device. That is, acting on the data may result in a computing device 90 reaching out to a computer system and communicating to the computer system that it (the computing device 90, the corresponding account, or the like) is associated with a particular layaway transaction. Accordingly, a link may be documented and, in the future, when the particular layaway transaction or account is at issue (e.g., has received a payment), a computer system may already know which computing device 90 or account to contact or use to reach the appropriate customer.

In selected embodiments, by decoding the machine-readable code 100, the application may obtain and import (e.g., be served 102 by the computer system) the corresponding receipt data 45. Alternatively, in selected methods, a machine-readable code 100 may be encoded with a URL 104. In addition to designating a particular resource, a URL 104 may also include certain identifications. For example, a URL 104 may include a layaway account number 106 (e.g., a layaway ID). Accordingly, after an appropriate application is launched and a machine-readable code 100 is scanned, a URL 104 may be passed from a customer (e.g., from a computing device 90 of a customer) to an Internet Service Provider (e.g., a telecommunications provider 108). As a result, one or more appropriate resources within a computer system may be accessed and receipt data 45 may be returned 102 to, downloaded 102 by, or served 102 to a computing device 90.

For example, in selected embodiments, a request may reach a web server 110 corresponding to the URL 104. The request may include the layaway ID 106. Thus, a web server 110 may pass the layaway ID 106 to a local server 26, a supervisory server 34, other resource, or the like. In response, receipt data 45 may be passed 102 back (e.g., through the web server 110, telecommunications provider 108, or the like) to the computing device 90.

Sometime after a layaway transaction has been initiated 92, a payment corresponding thereto may be issued and received 112. Such a payment may be received 112 in any suitable manner. In selected embodiments, a payment may be received 112 from a customer at a POS system 10 within a brick-and-mortar location. Alternatively, a payment may be received 112 via a computing device 90. Once a payment is received 111, one or more records corresponding to a layaway transaction may be updated 114 and an updated layaway receipt 46 may be served 116 or issued 116. For example, since a link may have already been established between an application installed on the particular computing device 90 and the layaway transaction, a layaway receipt 46 may be passed 116 directly to the computing device 90.

This process of receiving 112, updating 114, and serving 116 may be repeated until all required monies have been received. At that time, the layaway transaction may be completed 118 and one or more corresponding items may be delivered to the customer.

Figure 7:
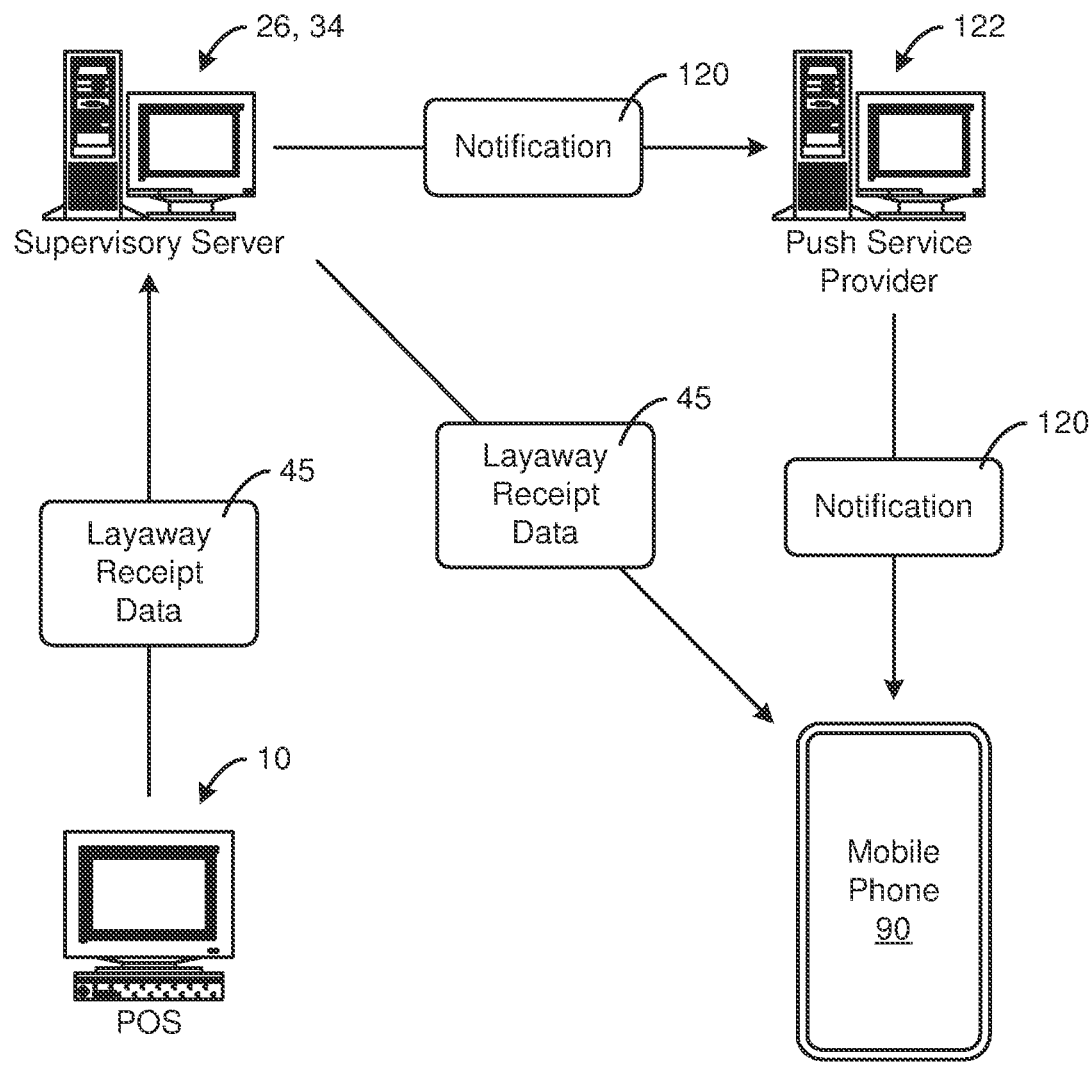
FIG. 7 is a block diagram of an alternative embodiment of a method for passing electronic layaway receipt data from a point-of-sale system to a computing device of a customer.
Figure 8:
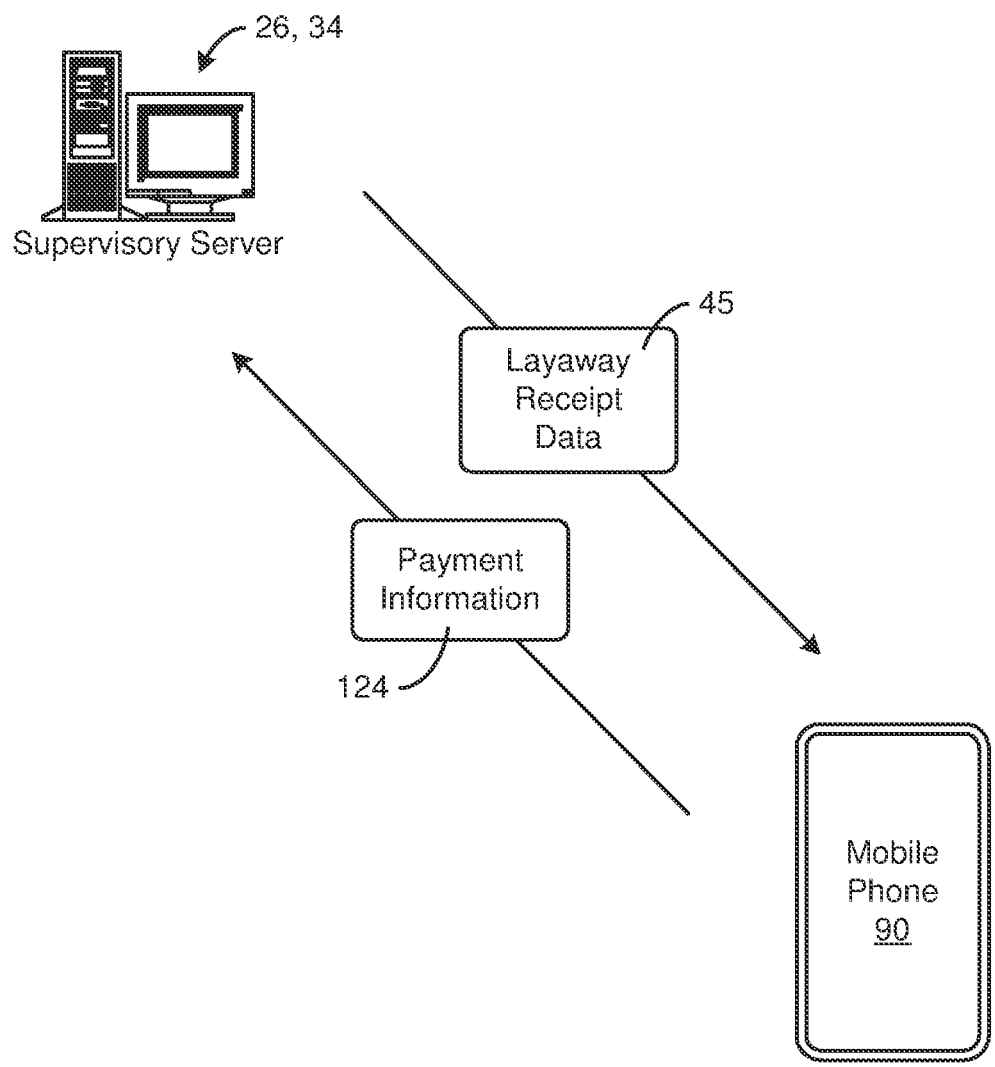
FIG. 8 is a block diagram of another alternative embodiment of a method for passing electronic layaway receipt data to a computing device of a customer.

Referring to FIGS. 7 and 8, once an initial link between an application resident on, or an account associated with, a computing device 90 and a computer system has been established, subsequent layaway receipt data 45 (e.g., updated receipt data 45 issued after a subsequent payment) may be delivered to the computing device 90 or account in any suitable manner. For example, if an appropriate application on a computing device 90 is not presently running, a push notification 120 may be generated and sent to the computing device 90. In selected embodiments, a push notification 120 may be a short message comprising a device token and a payload. A device token may contain information that enables a push service provider 122 (e.g., Apple Push Notification Service, Android Cloud to Device Messaging (C2DM), or the like) to locate the appropriate computing device 90 on which the application is installed. A device token may also permit a push service provider 122 to authenticate the routing of a push notification 120.

A payload of a push notification 120 may comprise various data. In selected embodiments, a payload may comprise a property list specifying how a customer associated with the computing device 90 is to be alerted. For example, a payload may specify an alert message to display to the customer (e.g., "You have a new electronic receipt"), a number with which to badge the application icon, a notification sound or vibration to play or execute, or the like. Alternatively, a push notification 120 may carry significantly more data (e.g., payload) than simply an alert message, alert sound, and the like. For example, a push notification 120 may carry certain receipt data 45 to a computing device 90.

Once a push notification 120 is received by a computing device 90, a customer may choose how he or she would like to respond. For example, should the customer elect to close the alert, the alert may be closed and the computing device 90 may wait until the next launch of the application to synchronize or download receipt data 45. Should the customer elect to launch the application, the launching of the application may automatically trigger synchronization or download of any new receipt data 45.

In selected embodiments or situations, an application corresponding to a computing device 90 may be running. Accordingly, receipt data 45 may be delivered directly thereto without the use of a push notification or the like. For example, in selected embodiments, payment information 124 or authorization 124 may be sent from an application installed on a computing device 90 to a computer system. Accordingly, the application may be running and layaway receipt data 45 reflecting the payment may be served 116 thereto.

The flowcharts and block diagrams in FIGS. 5-8 illustrate the architecture, functionality, and operation of possible implementations of systems, methods, and computer program products according to certain embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

Figure 9:
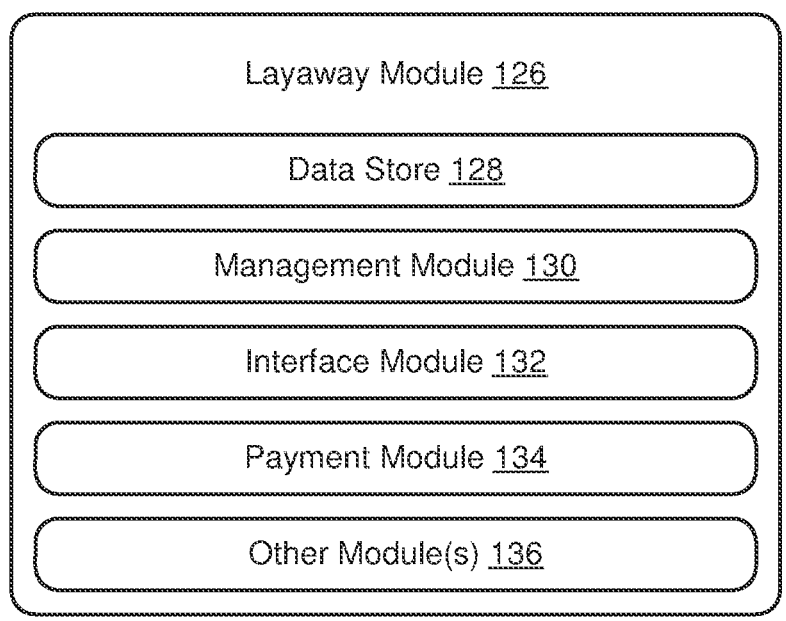
FIG. 9 is a schematic block diagram of one embodiment of a layaway module in accordance with the present invention.
Figure 10:
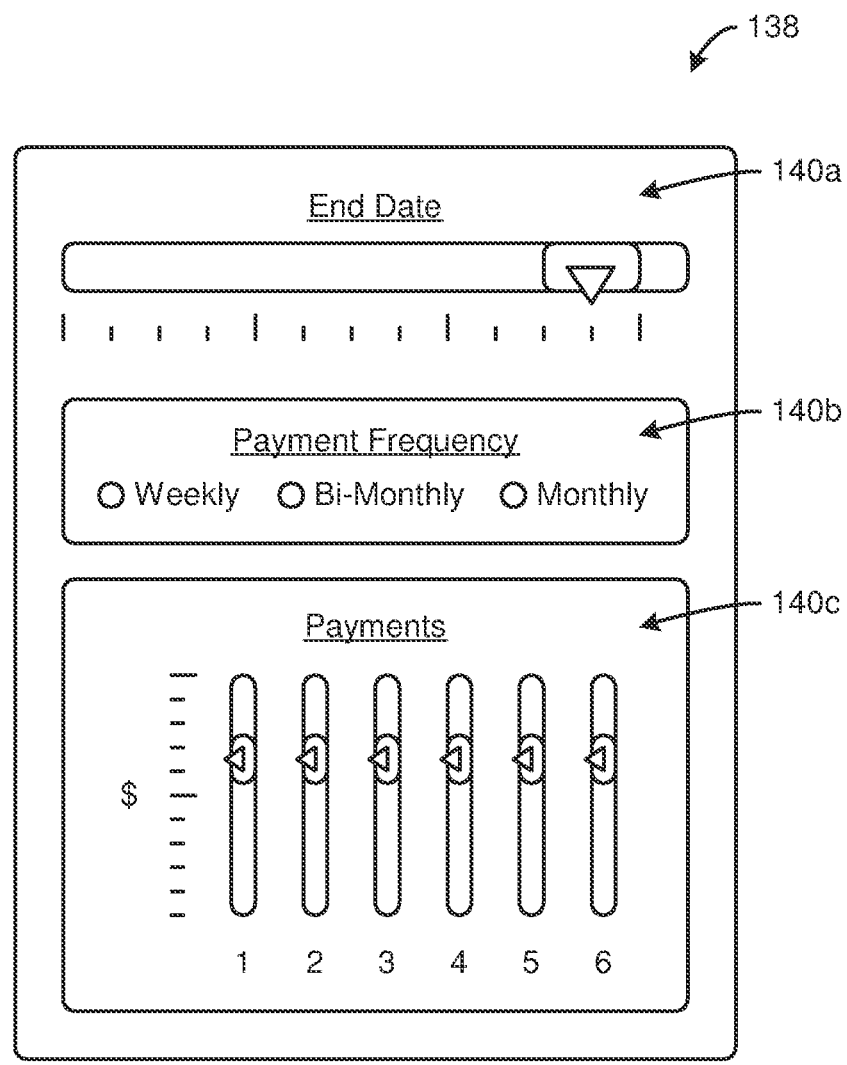
FIG. 10 is a schematic diagram of one embodiment of a user interface in accordance with the present invention.

Referring to FIGS. 9 and 10, a computer system, computing device, or some combination thereof may support one or more modules providing functionality related to a layaway program or system. For example, a computer system, computing device, or a combination thereof may support a layaway module 126. A layaway module 126 may enable an entity to layaway items and monitor and/or report certain conditions or calculations underlying or corresponding to corresponding layaway transactions. A layaway module 126 may include any suitable arrangement of sub-components or modules. In certain embodiments, a layaway module 126 may include a data store 128, management module 130, interface module 132, payment module 134, one or more other modules 136 as desired or necessary, or the like or a combination or sub-combination thereof.

A data store 128 may record selected data relevant to one or more layaway transactions, the various customers enrolled in the one or more layaway transactions, or the like or some combination thereof. For example, a data store 128 may receive receipt data 45 and record what item or items were laid away for a particular customer, the amount paid thus far, the balance due, the due date, and the like.

A management module 130 may provide a mechanism through which a layaway program may be managed. Functions of a management module 130 may include: receiving data from by a POS system 10, cashier, computing device 90, customer, or the like; processing the data received to ensure accuracy, proper formatting, and the like; submitting the data received to a data store 128 for storage; accessing data contained within a data store 128; tracking of inventory (e.g., tracking of items that have been physically or virtually set aside as part of a layaway transaction); calculating due dates; working with an identification module 78 in generating or obtaining certain identification information (e.g., layaway account number, customer identification number, or the like); monitoring and updating account balances; or the like or a combination or sub-combination thereof.

An interface module 132 may provide or support a user interface between a customer and one or more layaway accounts corresponding thereto. An interface module 132 may enable a customer to monitor (e.g., in real time) his or her progress toward paying off a layaway account. Additionally, an interface module 134 may support certain manipulations of a layaway transaction or corresponding account. For example, an interface module 132 may provide or support a user interface 138 through which a customer may adjust a first parameter 140a, 140b, 140c of a layaway transaction and see the effect thereof on at least one second parameter 140a, 140b, 140c of the layaway transaction.

In certain embodiments, an interface module 132 may provide or support a user interface 138 enabling a customer to control, enter, select, or adjust an end date 140a by which the customer would like to pay off the layaway account (which may be bounded or constrained on one end of its range by a due date 72), a payment frequency 140b (e.g., weekly, bi-monthly, monthly, or the like), an amount of one or more payments 140c the customer plans to make, or the like or a combination or sub-combination thereof.

For example, via one or more input boxes, sliders, buttons, or the like, a customer may select a desired pay off date 140a and a desired payment frequency 140c. Using such inputs, an interface module 132 may calculate the necessary number of payments 140c and the minimum monetary amounts associated therewith. Subsequent adjustments to an amount of one payments 140c may result in changes to one or more other payments 140c etc. Thus, an interface module 132 and a corresponding user interface 138 may enable a customer to concretely visualize and plan how best to pay off a layaway account.

A user interface 138 in accordance with the present invention may be accessed in any suitable manner. In selected embodiments, a user interface 138 may be accessible online after a user logs in to a particular website or the like. Alternatively, or in addition thereto, a user interface 138 may be accessible from a computing device 90 of a customer. For example, in selected embodiments, a user interface 138 may be accessible to or supported or generated by an application installed on a computing device 90.

A payment module 134 may monitor, support, enable, receive, process, or document one or more payments or payment authorizations corresponding to one or more layaway accounts. For example, a payment module 134 may (e.g., in cooperation with a management module 130) update one or more records within a data store 128 when a payment is received.

A payment module 134 may work with payments from any suitable source. For example, a payment module 134 may work with payments made in cash. Additionally, a payment module 134 may work with payments or payment authorizations corresponding to credit cards, bank accounts, online payment accounts (e.g., PAYPAL), or the like or a combination or sub-combination thereof.

A payment module 134 may work with payments originating from any suitable location. For example, a payment module 134 may work with payments made at a POS system 10 within a brick-and-mortar location. Alternatively, or in addition thereto, a payment module 134 may work with remote payments or payment authorizations originating from a computing device 90 of a customer.

In selected embodiments, a payment module 134 may facilitate the submission of one or more payments. For example, a payment module 134 may receive and store selected payment information (e.g., credit card information, bank account information, or the like). Accordingly, when a customer desires to send or authorize a payment, he or she may do so without reentering that information.

Additionally, in certain embodiments, a payment module 134 may support scheduled payments. Accordingly, a customer may schedule a payment ahead of time and a payment module 134 may ensure that the payment is submitted on the scheduled date. In selected embodiments, a payment module 134 may enable a customer to schedule an entire payment plan. For example, a customer may manipulate a user interface 138 to illustrate a desired payment plan. The customer may also enter certain payment information (e.g., credit card number or the like) and then instruct a payment module 134 to schedule and execute the corresponding payments.

The various functions or modules of a layaway module 126 may be enacted or implemented by any suitable system or component thereof. For example, in selected embodiments, one or more functions or modules of a layaway module 126 may be distributed across one or more hardware devices, including a primary computer 12 of a POS system 10, a local server 26, a supervisory server 34, some other onsite resource, a computing device of a customer, some other offsite resource, or the like or combinations or sub-combinations thereof. Thus, systems and methods in accordance with the present invention may be adapted to a wide variety of situations, including more rigid legacy systems.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for associating a computing device of a customer with a layaway transaction corresponding to the customer, the method comprising:
   initiating, by a computer system, a layaway transaction with a customer;
   issuing, by the computer system, a paper receipt documenting the layaway transaction and comprising a machine readable code;
   receiving, by the computer system from a computing device in the possession of the customer, a communication comprising data extracted by the computing device from the machine readable code;
   storing, by the computer system in response to the communication, a record identifying the computing device as a mechanism for communicating with the customer regarding the layaway transaction; and
   serving, by the computer system based on the record, a first electronic receipt documenting the layaway transaction to the computing device.

2. The method of claim 1, wherein the issuing comprises issuing the paper receipt with the machine readable code encoded with a layaway account number.

3. The method of claim 2, wherein the issuing comprises issuing the paper receipt with the machine readable code further encoded with a customer identification number.

4. The method of claim 2, further comprising receiving, by the computer system from the computing device, a payment corresponding to the layaway transaction.

5. The method of claim 4, wherein the receiving the payment comprises receiving an authorization to charge a credit card, online payment account, or bank account.

6. The method of claim 5, further comprising serving, by the computer system to the computing device, a second electronic receipt documenting the payment.

7. The method of claim 6, further comprising receiving, prior to the initiating, the customer within a brick-and-mortar location.

8. The method of claim 7, wherein the initiating comprising initiating the layaway transaction at a point-of-sale system contained within the brick-and-mortar location.

9. The method of claim 8, wherein the serving the first electronic receipt comprises serving an electronic copy of the paper receipt.

10. The method of claim 1, further comprising receiving, prior to the initiating, the customer within a brick-and-mortar location.

11. The method of claim 10, wherein the initiating comprising initiating the layaway transaction at a point-of-sale system contained within the brick-and-mortar location.

12. The method of claim 1, wherein the serving the first electronic receipt comprises serving an electronic copy of the paper receipt.

13. A method for associating a computing device of a customer with a layaway transaction corresponding to the customer, the method comprising:
   obtaining, by a computer system, access to a software application enabling a user thereof to experimentally adjust a first parameter of a layaway plan and see the effect thereof on at least one second parameter of the layaway plan;
   initiating, by the computer system, a layaway transaction with a customer;
   issuing, by the computer system, a paper receipt documenting the layaway transaction and comprising a machine readable code;
   receiving, by the computer system from an instance of the software application installed on a computing device in the possession of the customer, a communication comprising data extracted by the computing device from the machine readable code;
   storing, by the computer system in response to the communication, a record identifying the instance as a mechanism for communicating with the customer regarding the layaway transaction; and
   serving, by the computer system based on the record, data documenting the layaway transaction to the instance.

14. The method of claim 13, wherein the issuing comprises issuing the paper receipt with the machine readable code encoded with a layaway account number.

15. The method of claim 14, further comprising receiving, by the computer system from the instance, a payment corresponding to the layaway transaction.

16. The method of claim 15, wherein the receiving the payment comprises receiving an authorization to charge a credit card, online payment account, or bank account.

17. The method of claim 16, further comprising serving, by the computer system to the instance, a second electronic receipt documenting the payment.

18. The method of claim 17, further comprising receiving, prior to the initiating, the customer within a brick-and-mortar location.

19. The method of claim 18, wherein the initiating comprising initiating the layaway transaction at a point-of-sale system contained within the brick-and-mortar location.

* * * * *